US012183168B2

(12) United States Patent
Marsh et al.

(10) Patent No.: US 12,183,168 B2
(45) **Date of Patent: *Dec. 31, 2024**

(54) GAMING MACHINE WITH ENHANCED RESPIN FEATURE

(71) Applicant: Aristocrat Technologies Australia Pty Limited, North Ryde (AU)

(72) Inventors: David Marsh, Charlottesville, VA (US); Karl Roelofs, Charlottesville, VA (US)

(73) Assignee: ARISTOCRAT TECHNOLOGIES AUSTRALIA PTY LIMITED, North Ryde (AU)

( * ) Notice: Subject to any disclaimer, the term of this patent is extended or adjusted under 35 U.S.C. 154(b) by 1 day.

This patent is subject to a terminal disclaimer.

(21) Appl. No.: 17/987,342

(22) Filed: Nov. 15, 2022

(65) Prior Publication Data

US 2023/0073877 A1 Mar. 9, 2023

Related U.S. Application Data

(63) Continuation of application No. 16/927,301, filed on Jul. 13, 2020, now Pat. No. 11,521,468, which is a (Continued)

(51) Int. Cl.
*G07F 17/34* (2006.01)
*G07F 17/32* (2006.01)

(52) U.S. Cl.
CPC .......... *G07F 17/34* (2013.01); *G07F 17/3213* (2013.01); *G07F 17/323* (2013.01); *G07F 17/3258* (2013.01)

(58) Field of Classification Search
CPC .... G07F 17/34; G07F 17/3213; G07F 17/323; G07F 17/3258
See application file for complete search history.

(56) References Cited

U.S. PATENT DOCUMENTS 6,186,894 B1 * 2/2001 Mayeroff ................ G07F 17/34 463/16
6,290,600 B1 * 9/2001 Glasson .............. G07F 17/3265 463/20

(Continued)

OTHER PUBLICATIONS

Notice of Allowance dated Mar. 23, 2020, for U.S. Appl. No. 15/890,765 (pp. 1-8).

(Continued)

*Primary Examiner* — Justin L Myhr
*Assistant Examiner* — Carl V Larsen
(74) *Attorney, Agent, or Firm* — McAndrews, Held & Malloy, Ltd.

(57) ABSTRACT

A gaming machine includes a display device and a game controller. The display device includes reels disposed horizontally along the display device. The reels include an initial reel, intermediary reels disposed right of the initial reel, and a last reel disposed right of the intermediary reels. Each reel presents a vertical column of symbols. The game controller spins the reels to obtain a first game outcome comprising a first array of symbols. In response to a first reel presenting a respin symbol, the game controller selects a second reel that is adjacent to the first reel based on wrap-around adjacency between the initial reel and the last reel, and respins the second reel to obtain a second game outcome comprising a second array of symbols. The game controller may also respin a horizontal row of symbols adjacent a respin symbol.

14 Claims, 11 Drawing Sheets

Related U.S. Application Data continuation of application No. 15/890,765, filed on Feb. 7, 2018, now Pat. No. 10,733,849.

(56) References Cited

U.S. PATENT DOCUMENTS

| | | | | |
|---|---|---|---|---|
| 9,214,071 | B2 | 12/2015 | Hornik | |
| 9,564,002 | B2 | 2/2017 | Berman | |
| 10,115,266 | B2 * | 10/2018 | Shaik | G07F 17/326 |
| 11,521,468 | B2 * | 12/2022 | Marsh | G07F 17/34 |
| 2004/0242316 | A1 * | 12/2004 | Oles | G07F 17/3209 463/20 |
| 2007/0155474 | A1 * | 7/2007 | Gauselmann | G07F 17/3244 463/20 |
| 2009/0325678 | A1 * | 12/2009 | Gomez | G07F 17/34 463/20 |
| 2010/0298041 | A1 * | 11/2010 | Berman | G07F 17/3213 463/20 |
| 2011/0111823 | A1 * | 5/2011 | Leger | G07F 17/3267 463/20 |
| 2011/0136562 | A1 * | 6/2011 | Loat | G07F 17/3267 463/20 |
| 2016/0275755 | A1 * | 9/2016 | Oh | G07F 17/34 |
| 2016/0364944 | A1 * | 12/2016 | Elias | G07F 17/34 |

OTHER PUBLICATIONS

Office Action (Non-Final Rejection) dated Sep. 30, 2021 for U.S. Appl. No. 16/927,301 (pp. 1-10).
Office Action (Final Rejection) dated Apr. 25, 2022 for U.S. Appl. No. 16/927,301 (pp. 1-12).
Office Action (Notice of Allowance and Fees Due (PTOL-85) dated Sep. 27, 2022 for U.S. Appl. No. 16/927,301 (pp. 1-8).
Australian Examination Report No. 1 issued in App. No. AU2019200806, dated Dec. 5, 2022, 4 pages.
Australian Examination Report No. 2 issued in App. No. AU2019200806, dated Nov. 30, 2023, 5 pages.

* cited by examiner

GAMING MACHINE WITH ENHANCED RESPIN FEATURE

RELATED APPLICATIONS

This application is a continuation of U.S. patent application Ser. No. 16/927,301, filed Jul. 13, 2020, which is a continuation of U.S. patent application Ser. No. 15/890,765, filed Feb. 7, 2018, the contents of which are hereby incorporated herein by reference in their entirety.

TECHNICAL FIELD

The present disclosure relates to gaming and wagering, and more specifically to electronic gaming machines that permit wagering upon outcomes of spinning reels.

BACKGROUND

Electronic gaming machines ("EGMs") provide a variety of wagering games such as slot games, video poker games, roulette games, keno games, and other types of games that are frequently offered at casinos and other locations for use by players. Play on EGMs typically involves a player placing a wager on outcomes of a base or primary game. On many such EGMs, secondary games or bonus rounds are also available after the player qualifies by attaining a certain winning combination or event on or related to the primary game. Once qualified, the player then enters the secondary game or bonus round where they are given an opportunity to win extra game credits, game tokens or other awards. In the case of "game credits" that are awarded during play of primary game or play of a secondary game, the credits are typically added to a credit meter total on the EGM and provided to the player upon completion of a gaming session when the player "cashes out."

SUMMARY

In some embodiments, a gaming machine includes a credit input mechanism, a display device, and a game controller. The credit input mechanism is configured to receive a physical item representing a monetary value and increase a credit balance of a credit meter based on the monetary value of the received physical item. The display device includes reels disposed horizontally along the display device. The reels include an initial reel, intermediary reels disposed right of the initial reel, and a last reel disposed right of the intermediary reels. Each reel presents a vertical column of symbols.

The game controller is configured to decrease the credit balance based on a wager, spin the reels to obtain a first game outcome comprising a first array of symbols, and increase the credit balance for a first prize awarded based on the first array of symbols. In response to a first reel presenting a respin symbol, the game controller is further configured to select a second reel that is adjacent to the first reel based on wrap-around adjacency between the initial reel and the last reel in which the game controller considers the last reel to be disposed left of the initial reel and the initial reel to be disposed right of the last reel. Alternatively or additionally, the game controller may respin a horizontal row of symbols adjacent to the respin symbol.

BRIEF DESCRIPTION OF THE DRAWINGS

In the drawings, various dimensions may be exaggerated for illustrative clarity. Additionally, like reference numbers are utilized to refer to like elements throughout the present disclosure.

DETAILED DESCRIPTION

Figure 1:
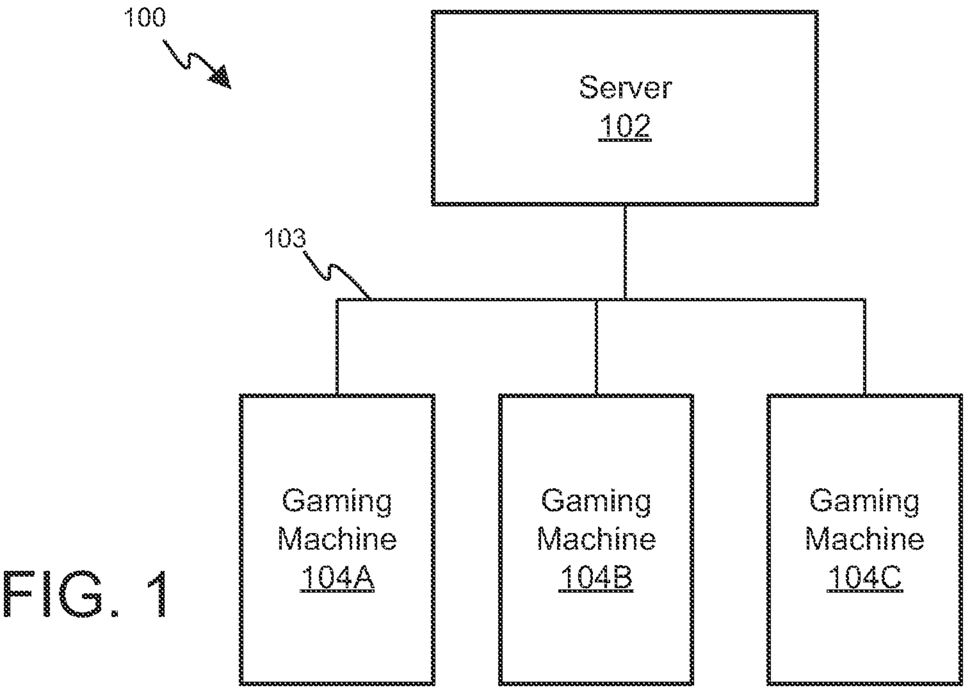
FIG. 1 depicts a gaming system in accordance with various aspects of the present disclosure.

Various aspects of the present disclosure are directed to gaming systems and gaming machines that respin one or more reels of the gaming machine in response to defined game outcomes. In particular, gaming machine may spin the reels and may stop each reel in a randomly determined position to obtain a first game outcome comprising a first array of symbols. The gaming machine may then analyze the first array of symbols to determine whether the first array of symbols includes one or more winning combination of symbols. If any winning combination of symbols are present, the gaming machine may award prizes for each winning combination of symbols. For example, the gaming machine may increase a credit meter by a number of credits specified in a pay table for the winning combination of symbols.

After awarding prizes for any winning combinations in the first array of symbols, the gaming machine may determine whether any reel displays a respin symbol. If the respin symbol is present, the gaming machine respins a reel and/or row of symbols adjacent to the displayed respin symbol to obtain a second game outcome comprising a second array of symbols. The gaming machine may then analyze the second array of symbols to determine whether the second array of symbols includes one or more winning combination of symbols. If any winning combination of symbols are present, the gaming machine may award prizes for each winning combination of symbols.

After awarding prizes for any winning combinations in the second array of symbols, the gaming machine may determine whether the respun reel displays a respin symbol. If the respun reel displays a respin reel, the gaming machine respins a reel that is adjacent to the respun reel to obtain a third game outcome. The gaming machine may repeat the process of respinning adjacent reels and awarding prizes until a respun reel fails to display a respin symbol. In some embodiments, the mechanical reels are implemented as virtual reels. In particular, the main display may include a video display device that presents a video simulation or animation of spinning mechanical reels.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z."

As used herein, the singular forms are intended to include the plural forms as well, unless the context clearly indicates otherwise. The terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

Although the terms first, second, etc. may be used herein to describe various elements, these elements should not be limited by these terms. These terms are only used to distinguish one element from another element. Thus, for example, a first element, a first component, or a first section could be termed a second element, a second component, or a second section without departing from the teachings of the present disclosure. Similarly, various spatial terms, such as "upper," "lower," "side," and the like, may be used in distinguishing one element from another element in a relative manner. However, components can be oriented in different manners. For example, a component can be turned sideways so that its "top" surface is facing horizontally and its "side" surface is facing vertically, without departing from the teachings of the present disclosure.

Referring now to FIG. 1, an example embodiment of a gaming system 100 is depicted. As shown, the gaming system 100 may include one or more servers 102 such as, for example, a slot server of a casino, that is in communication with one or more gaming machines or EGMs 104A-C such as, for example, slot machines, video poker machines, etc. via a communications network 103. While FIG. 1 depicts three gaming machines 104A-C, other embodiments of the gaming system 100 may include a different number of gaming machines in communication with the server 102.

The server 102 may communicate with the gaming machines 104A-C directly or indirectly via the communications network 103. In particular, the communications network 103 may include wired and/or wireless medium that support communication between the gaming machines 104A-C and the server 102 and communications among the gaming machines 104A-C. For example, communications may transpire across an online data network including commercial online service providers, Internet service providers, private networks, and the like. In yet other embodiments, the gaming machines 104A-C may communicate with one another and/or the server 102 via RF network, cable TV networks, satellite links, etc.

In some embodiments, the communications network 103 may include one or more of the following networks: a local area network (LAN), a wide area network (WAN), the Internet, a telephone network, a cable TV network, a radio networks, an optical communications network, and a satellite communications network. The communications network 103 may further utilize one or more of the following network protocols: Ethernet (IEEE 802.3), SAP, ATP, Bluetooth™, and TCP/IP. Communications over the network 103 may be encrypted to ensure privacy, provide security, and prevent fraud in any of a variety of ways well known in the art.

In some embodiments, the server 102 may not be necessary and/or preferred. For example, aspects of the present disclosure, may be practiced on a stand-alone gaming machine 104A and/or a gaming machine 104A that directly communicates with one or more other gaming machines 104B-C via the communications network 103 (i.e., without the server 102). In such embodiments, any functions described as performed by the server 102 or data described as stored on the server 102 may instead be performed by or stored on one or more gaming machines 104A-C.

Figure 2:
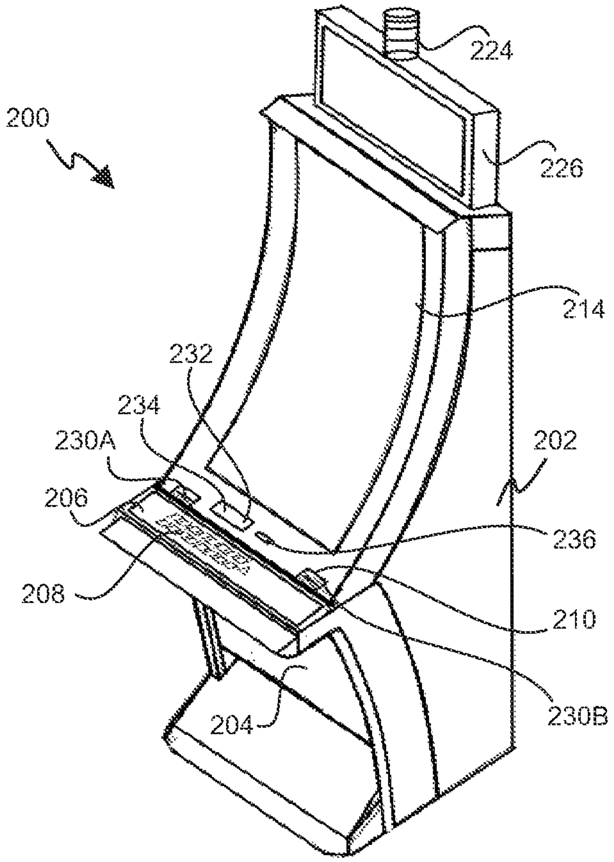
FIG. 2 depicts an exemplary gaming machine of the gaming system of FIG. 1.
Figure 3A:
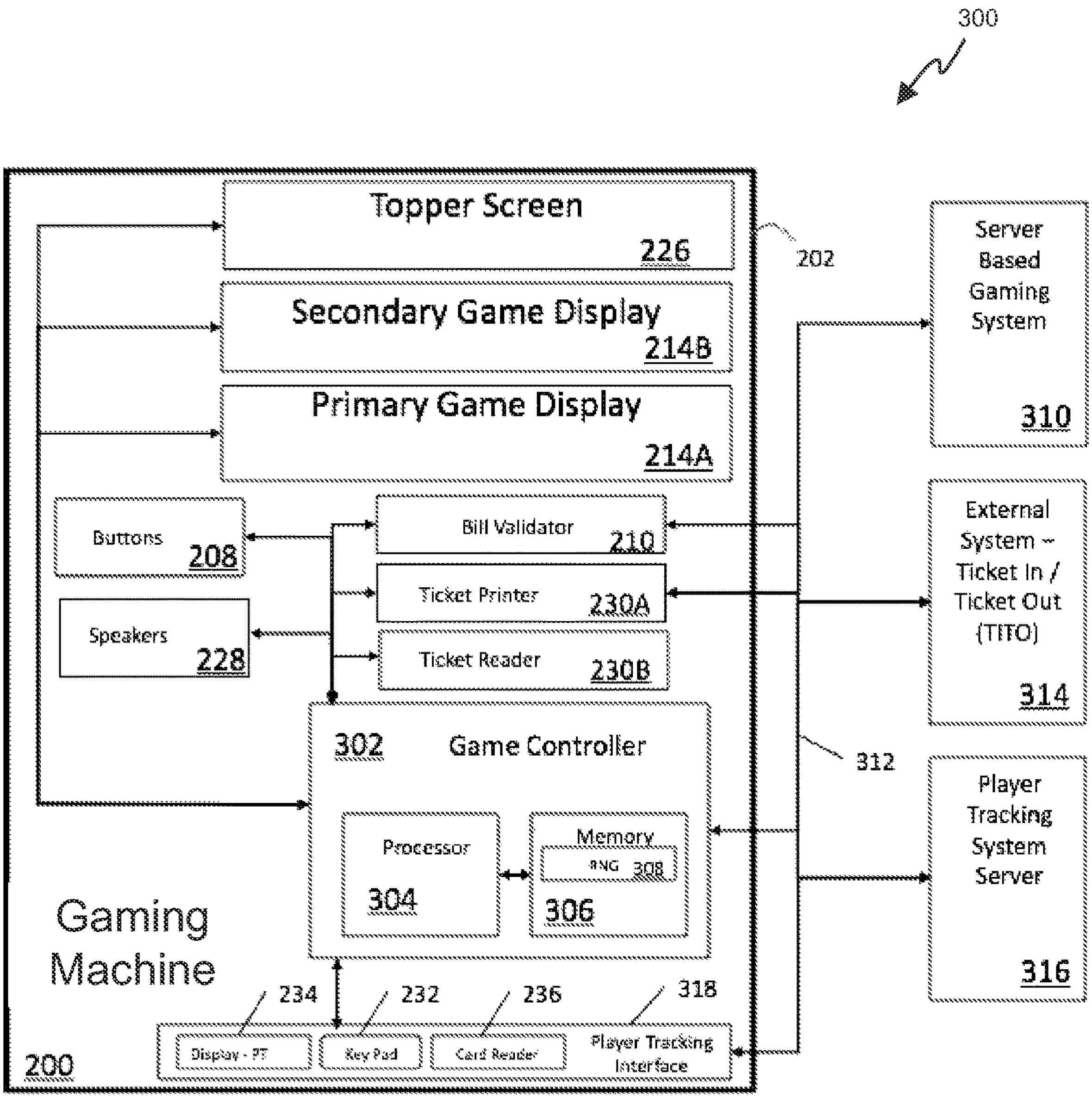
FIG. 3A depicts an exemplary embodiment of the gaming system of FIG. 1.

Referring now to FIG. 2, an example gaming machine 200 suitable for implemented any one of the gaming machines 104A-C is shown. The gaming machine 200 may include a main cabinet 202 including a main door 204 which opens to provide access to the interior of the gaming machine 200. In particular, the main cabinet 202 may house circuitry, electrical components, and electromechanical components of the gaming machine 200. In particular, the main cabinet 202 may house a gaming controller (see, e.g., FIG. 3A) configured to control the various components of the gaming machine 200 and execute a wagering game as described in detail below. The main cabinet 202 may also include a button deck 206 with buttons 208, which a player may actuate in order to operate the gaming machine 200 and play a wagering game. Various other components may be housed by the main cabinet 202 or mounted to the main cabinet 202. For example, the gaming machine 200 includes a sound system and speakers 228 (as shown in FIG. 3A) that may be mounted to or housed by the main cabinet 202 for playing game sound effects and music to enhance the player's game play experience.

A credit input mechanism 210 such as a bill validator or coin-in slot may also be mounted to the main cabinet 202. The credit input mechanism 210 may receive physical items associated with a monetary value such as coins, bills, etc. to permit the gaming machine to establish an associated credit value of a credit meter. In some embodiments, a credit output mechanism such as coin tray or coin chute may also be mounted to the main cabinet 202. Such credit output mechanism may permit the gaming machine 200 to dispense coins when a player cashes out any remaining credits on the credit meter or to dispense winning directly to the player in lieu of increasing the credit meter.

As shown, the gaming machine 200 includes a main display 214 mounted above the button deck 206. The main display 214 may include a high-resolution LCD, plasma, LED, or OLED panel which may be in a portrait configuration with curvature radius from top to bottom as shown.

In some embodiments, the bill validator 210 may also function as a "ticket in" reader 230B that allows the player to use a casino issued credit ticket to load credit onto the gaming machine 200 (e.g., in a cashless ticket system). In such cashless embodiments, the gaming machine 200 may also include a "ticket out" printer 230A for outputting a credit ticket when a "cash out" button is pressed. Cashless ticket systems (see, e.g., FIG. 3A) may be used to generate and track unique bar-codes that are printed on tickets. Such tickets allow players to avoid the use of bills and coins for loading credits on a credit meter of the gaming machine 200. Instead, players may load credits using a ticket reader 230B and may cash out credits from the credit meter through the use of the ticket printer 230A.

In some embodiments, the gaming machine 200 may include a player tracking interface 318 (see, e.g., FIG. 3A) that includes a card reader 236, a transceiver for wireless communication with a player's smart phone, a key pad 232, and/or an illuminated display 234 for reading, receiving, entering, and/or displaying player tracking information. In such embodiments, the gaming machine 200 may communicate with the server 102 via the player tracking interface 318 to send and receive player tracking information.

In the depicted embodiment, the gaming machine 200 does not include physical reels and instead shows game play functions on the main display 214. The gaming machine 200 may further include an optional topper screen 226. The topper screen 226 may be used as a secondary game display for bonus play or may be used to show game features or attraction activities while the game is not in play. The topper screen 226 may also display any other information or media desired by the game designer or operator. In some embodiments, the topper screen 226 may also be used to display progressive jackpot prizes available to a player during play of gaming machine 200.

A candle 224 may be mounted on the top of gaming machine 200. In some embodiments, a player may activate the candle 224 via a button 208 in order to inform operations staff that the gaming machine 200 has experienced a malfunction or that the player requires service.

While an example gaming machine 200 has been described in regard to FIG. 2, certain aspects of the present disclosure may be implemented by gaming machines that lack one or more of the above-described components. For example, not all gaming machines suitable for implementing aspects of the present disclosure necessarily include top boxes, information panels, cashless ticket systems, and/or player tracking systems. Further, some suitable gaming machines may include a single game display having a mechanical reels or a video display. Moreover, other embodiments may be designed for bar tables and have displays that face upwards.

Many different types of wagering games, including mechanical slot games, video slot games, video poker, video black jack, video pachinko, keno, bingo, and lottery, may be provided by the gaming machine 200. In particular, a gaming machine 200 may be operable to provide many different instances of games of chance. The instances may be differentiated according to themes, sounds, graphics, type of game (e.g., slot game vs. card game vs. game with aspects of skill), denomination, number of paylines, maximum jackpot, progressive or non-progressive, bonus games, class 2 or class 3, etc.

The gaming machine 200 may allow a player to select a game of chance, skill, or combination thereof, to play from a plurality of instances available on the gaming machine 200. For example, the gaming machine 200 may provide a menu with a list of the instances of games that are available for play on the gaming machine 200 and a player may be able to select from the list a game that they wish to play.

Turning now to FIG. 3A, a block diagram of an exemplary embodiment of a gaming system 300, such as the gaming system 100 of FIG. 1, is shown. FIG. 3A depicts internal electronic components of the example gaming machine 200. FIG. 3A further shows such internal components connected to external systems via the communications network 312, such as the communications network 103 of FIG. 1. The various instances of games available for play on the gaming machine 200 are controlled by a game controller 302. The game controller 302 may include a processor 304 and memory 306 configured to store game software having a plurality of instructions that, when executed by the processor 304, cause the gaming machine 200 to implement a wagering game. The memory 306 may include one or more mass storage devices or media housed within main cabinet 202.

The game controller 302 may also include a pseudo-random number generator or RNG 308. The RNG 308 can be implemented via hardware and/or software.

Moreover, the RNG 308 may generate random numbers that are used in the operation of game play to ensure that game play outcomes are random and meet regulations for a game of chance.

Alternatively, in some embodiments, a game instance may be generated on a remote gaming machine such as a server based gaming system 310. The game instance is communicated to gaming machine 200 via network 312 and then displayed on gaming machine 200. Gaming machine 200 may execute game software, such as but not limited to video streaming software that allows the game to be displayed on gaming machine 200. When an instance is stored on gaming machine 200, the instance may be loaded from a memory (e.g., from a read only memory (ROM)) or from the server based gaming system 310 to the memory 306. The memory 306 may be RAM, ROM, a combination of the two types or another form of storage media that stores instructions for execution by processor 304.

Gaming machine 200 may include a topper screen 226 or another form of a top box (e.g., a topper wheel) which sits on top of cabinet 202. In addition to the components described above, either main cabinet 202 or topper screen 226 also house a number of other components which may be used to add features to a game being played on gaming machine 200, including speakers 228, a ticket printer 230A which prints bar-coded tickets, a ticket reader 230B which reads bar-coded tickets, a key pad 232 for entering player tracking information, an illuminated display 234 for displaying player tracking information, a card reader 236 for receiving data and/or communicating information to and from media or a device such as a smart phone enabling player tracking. Ticket printer 230A may be used to print tickets for a cashless ticketing system 314.

As noted above, gaming machine 200 may include a main display 214. As shown in FIG. 3A, the main display 214 may include a primary game display 214A and a secondary game display 214B. The display 214A, 214B may correspond to separate display areas of a single display device. In other embodiments, the main display 214 may include a separate display device for each of the displays 214A, 214B.

Gaming machine 200 may be connected over network 312 to player tracking system server 316. Player tracking system server 316 may be, for example, an OASIS® system manufactured by Aristocrat Technologies, Inc. Player tracking system server 316 may track play for individual players so that an operator may reward players in a loyalty program. To this end, a player may use the player tracking interface 318 that includes player tracking keypad 232, player tracking display 234, and card reader 236 to provide information from which the player tracking system server 316 may identify the player.

The player tracking system server 316 may implement a player tracking program for the gaming machine 200. Player tracking programs may help to sustain a game player's interest in additional game play during a visit to a gaming establishment and may entice a player to visit a gaming establishment to partake in various gaming activities. Player tracking programs may provide rewards to players that typically correspond to the player's level of patronage (e.g., to the player's playing frequency and/or total amount of game plays at a given casino). Player tracking rewards may include free meals, free lodging, and/or free entertainment. Further details of a player tracking system can be found in Patent Pub. No. US 2009/0054139 A1 which is hereby incorporated herein for all purposes.

While FIG. 3A provides details regarding one embodiment of the gaming machine 200, aspects of the present disclosure may be implemented with gaming machines having more or fewer elements than are depicted in FIG. 3A. For example, some gaming machines in accordance with aspects of the present disclosure may lack a player tracking interface 318.

Figure 3B:
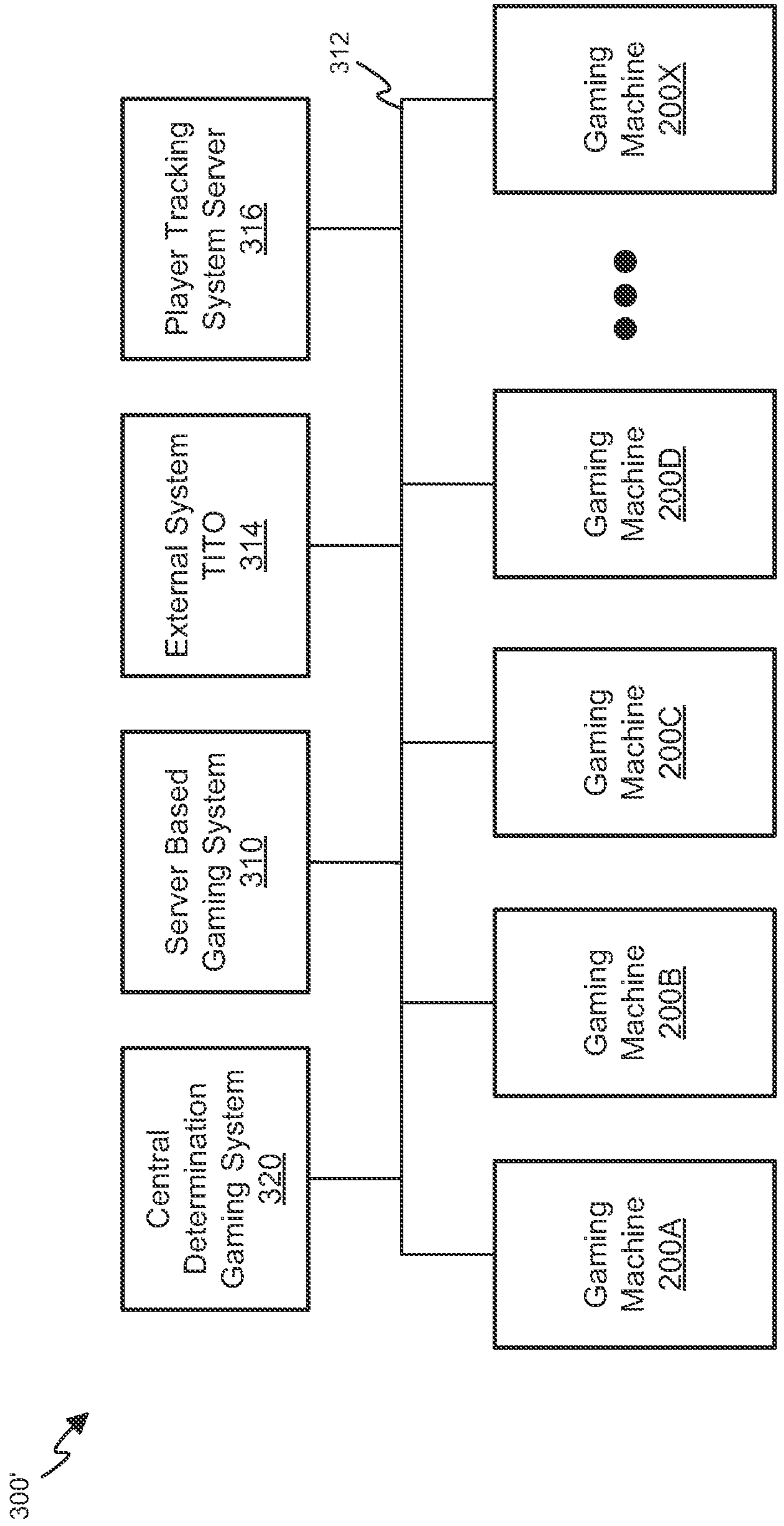
FIG. 3B depicts another exemplary embodiment of the gaming system of FIG. 1.

FIG. 3B depicts a gaming system 300' which is an alternative embodiment of the gaming system 300 of FIG. 3A. The gaming system 300' includes a central determination gaming system 320. A game outcome may be generated on central determination gaming system 320. The game outcome is then transmitted over network 312 to any one of the gaming machines 200A-X that utilize the game outcome and display the result to the player. In various embodiments, such as in a class 2 game, the results of the primary game (e.g., bingo) may be transmitted over network 312 to the appropriate gaming machine 200A-X for presentation to the player via a simulated game (e.g., a spinning reel game, keno, blackjack, etc.). For example, the gaming machine 200A-X may receive the results of the primary game and generate a simulated game having results corresponding to the received results of the primary game. The gaming machines 200A-X are connected to the central determination gaming system 320 via a network 312 such as a local area network, a wide area network, an intranet or the Internet. The gaming machines 200A-X may be portable gaming machines such as, but not limited to, a smart phone, a tablet, a laptop, a cell phone, a personal digital assistant, a personal computer, and a wireless game player. In some embodiments, images rendered from 3-D gaming environments may be displayed on portable gaming machines that are used to play the game. Further the gaming machines 200A-X or the central determination gaming system 320 server may include gaming logic for commanding a gaming machine 200A-X to render an image from a virtual camera in 3-D gaming environments stored on the gaming machines 200A-X and to display the rendered image on a display located on the gaming machines 200A-X.

Some aspects of the present disclosure may be advantageously practiced via a networked server based gaming system 310. Examples of such networked server based systems are described in U.S. Pub. 2007/0026935, by Wolf et al., entitled "METHODS AND DEVICES FOR MANAGING GAMING NETWORKS" and filed Sep. 12, 2005, which is incorporated herein by reference in its entirety and for all purposes.

Returning now to the example of FIG. 3A, when a user wishes to play the gaming machine 200, he or she inserts cash through the coin acceptor or bill validator 210. Alternatively, bill validator 210 may include ticket reader 230B enabling the acceptance of a printed ticket voucher which may be accepted as an indicia of credit when a cashless ticketing system 314 is used. At the start of the game, the player may enter playing tracking information using card reader 236, keypad 232, and the display 234. Further, other game preferences of the player playing the game may be read from a card inserted into the card reader 236. During the game, the player views game information using video displays 214A, 214B. Other game and prize information may also be displayed on topper screen 226.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input buttons 208, the video display screen 214A which may be a touch screen, or using some other device which enables a player to input information into the gaming machine 200. In some embodiments, the player may be able to access various game services such as concierge services and entertainment content services using video display screen 214 and one or more input devices.

During certain game events, the gaming machine 200 may display visual, auditory, and other sensory effects that can be perceived by the player. These effects add to the excitement of a game, which makes a player more likely to continue playing. Auditory effects include various sounds that are projected by the speakers 228. Visual effects include flashing lights, strobing lights, or other patterns displayed from lights on the gaming machine 200 or from lights behind an information panel. After the player has completed a game, the player may receive game credits, game tokens from a credit output mechanism such as a coin tray (not shown) or a ticket from printer 230A, which may be used for further games or to redeem a prize. Further, the player may receive a ticket for food, merchandise, or games from printer 230A.

Figure 4:
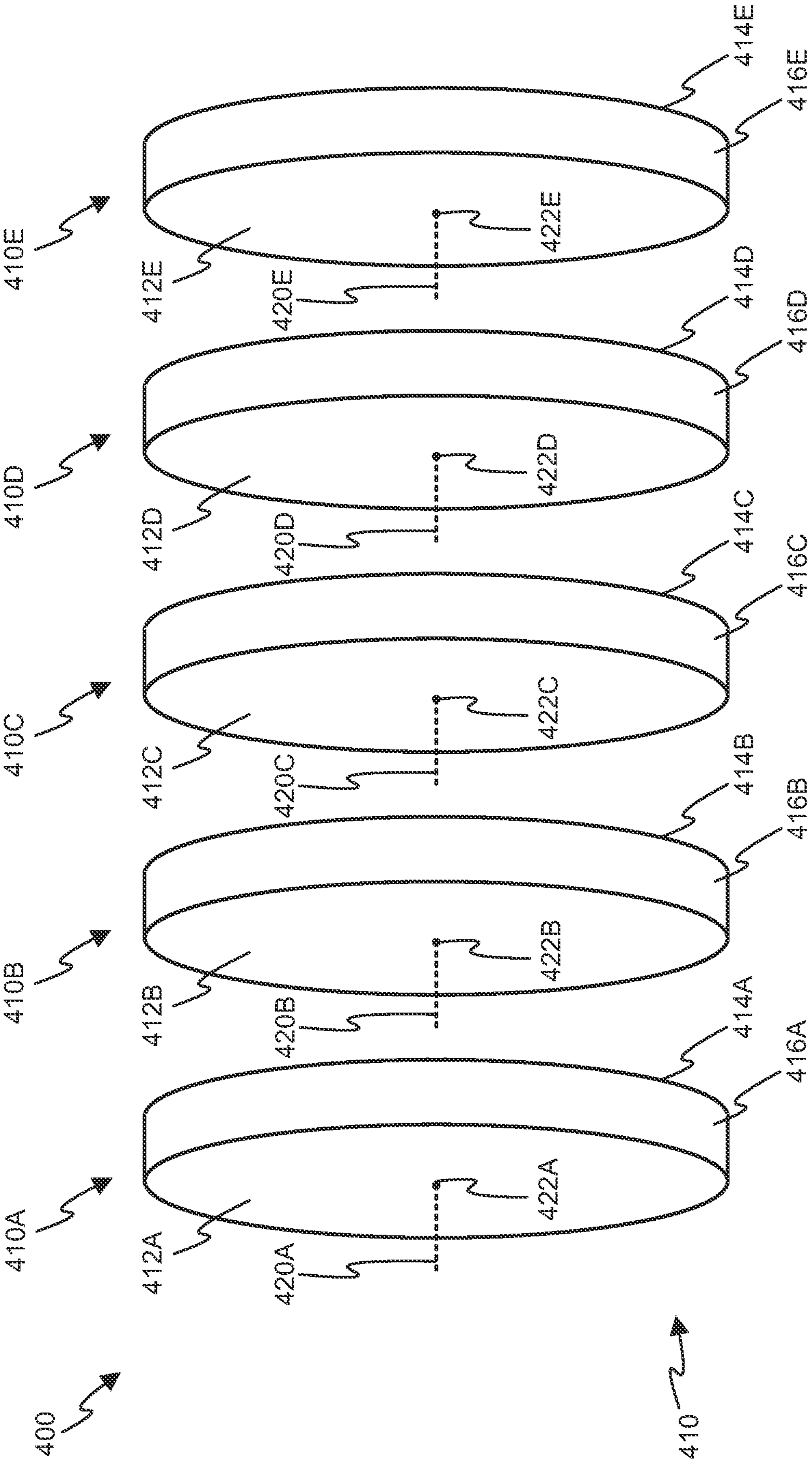
FIG. 4 depicts an exemplary arrangement reels of the gaming machine of FIG. 2.

As explained above, the gaming machine 200, in some embodiments, does not include physical or mechanical reels. In such embodiments, the gaming machine 200 may displays game play functions such as, for example, the spinning of reels via a video display of the main display 214. Referring now to FIG. 4, an exemplary arrangement 400 of reels 410 is presented. Such depiction of reels 410 is generally applicable to the reels 410 of the gaming machine 200 regardless of whether the reels 410 are implemented as mechanical reels or as a simulation or animation of reels displayed upon a video display of the main display 214.

As shown, the arrangement 400 may include five reels 410A, 410B, 410C, 410D, 410E, though arrangements having a different number of reels 410 (e.g., three, four, etc.) are contemplated. In the exemplary arrangement 400, each reel 410A-410E may have a right circular cylindrical shape comprising circular ends 412A-412E, 414A-414E connected by a cylindrical outer surface 416A-416E. However, other embodiments of reels 410A-410E may utilize a different right cylindrical shape in which the ends 412A-412E do not have circular shape but instead have a regular polygonal shape or have another shape. As further shown, each reel 410A-410E includes an axis of rotation 420A-420E that passes through a central point 422A-422E of ends 412A-412E. The reels 410A-410E may be mounted in a side-by-side manner across the main display 214 such that the their axes of rotation 420A-420E are arranged along a common axis that spans horizontally across the main display 214.

Each reel 410A-410E may further carry symbols along its outer surface 416A-416E. In particular, the outer surface 416A-416E of each reel 410A-410E may carry symbols selected from a set of symbols (e.g., cherries, bars, double bars, triple bars, sevens, wilds, scatter, respin, etc.). For example, the outer surfaces 416A-416E may carry many symbols (e.g., twenty-two or more), but present only a small subset of such symbols to the player via the main display 214. Such an arrangement 400 of reels 410A-410E results in the outer surface 416A-416E of each reel 410A-410E presenting a column of symbols to the player. Thus, in the depicted five reel arrangement 400, the reels 410A-410E may present five columns of symbols.

Referring now to FIGS. 5A-5H, further details regarding symbols presented by the outer surfaces 416A-416E of the reels 410A-410E are depicted. As noted above, the outer surfaces 416A-416E may carry many symbols, but may present only a small subset of such symbols to the player via the main display 214. To this end, the reels 410A-410E may be physically masked or otherwise implemented such that each reel 410A-410E presents a relatively small number (e.g., three) of display positions to the player when the reels are stopped or otherwise at rest. For example, the first reel 410A may provide three vertically disposed display positions 410$A_1$, 410$A_2$, 410$A_3$; the second reel 410B may provide three vertically disposed display positions 410$B_1$, 410$B_2$, 410$B_3$; the third reel 410C may provide three vertically disposed display positions 410$C_1$, 410$C_2$, 410$C_3$; the fourth reel 410D may provide three vertically disposed display positions 410$D_1$, 410$D_2$, 410$D_3$; and the fifth reel 410E may provide three vertically disposed display positions 410$E_1$, 410$E_2$, 410$E_3$.

As a result of such arrangement, the main display 214 may present an 3×5 symbol array 430. While a 3×5 symbol array 430 is shown, other embodiments may include a fewer number of reels (e.g., three reels total) or greater number of reels (e.g., six reels total). Furthermore, each reel may include a different number of display positions. Moreover, while each reel 410A-410E may present the same number of symbols (e.g., three), embodiments in which not all of the reels 410A-410E present the same number of symbols are contemplated. For example, the central reel 410C in some embodiments may provide a greater number of display positions (e.g. four) than the other reels 410A, 410B, 410D, 410E.

The gaming machine 200 may utilize one or more paylines to determine whether the symbol array 430 contains a winning symbol combination or whether the symbol array 430 contains symbols that trigger a game event. In particular, a gaming machine 200 may provide one or more paylines and may allow the player to make a wager on each payline in a play of the primary game. For example, the gaming machine 200 may include 1, 3, 5, 9, 15, 25, or some other number of paylines upon which the player may wager or otherwise activate. The gaming machine 200 may allow players to make wagers of substantially different amounts on each play of the primary or base game ranging, for example, from one credit up to 125 credits (e.g., five credits on each of 25 separate paylines).

The paylines may be horizontal (see, e.g., paylines 500$_1$, 500$_2$, 500$_3$ of FIGS. 5A-5H), vertical, circular, diagonal, angled, zigzagged, or any combination thereof. Each payline identifies a subset of symbols or display positions of the symbol array 430. For example, FIGS. 5A-5H depict an embodiment having three horizontal paylines 500$_1$, 500$_2$, 500$_3$. The top payline 500$_1$ corresponds to the top row of display positions 410$A_1$, 410$B_1$, 410$C_1$, 410$D_1$, 410$E_1$. The center payline 500$_2$ corresponds to the center row of display positions 410$A_2$, 410$B_2$, 410$C_2$, 410$D_2$, 410$E_2$. The bottom payline 500$_3$ corresponds to the bottom row of display positions 410$A_3$, 410$B_3$, 410$C_3$, 410$D_3$, 410$E_3$. In one embodiment, the gaming machine 200 may spin the reels 410 and award prizes if the reels 410 after stopping present a winning combination of symbols along a payline 500$_1$, 500$_2$, 500$_3$. In some embodiments, the paylines 500$_1$, 500$_2$, 500$_3$ are selectively activated based on for example a player's wager or gaming outcomes. In such embodiments, the gaming machine 200 may only award prizes or trigger game events based on symbols aligned with activated paylines 500$_1$, 500$_2$, 500$_3$.

Further details regarding a respin feature of the gaming machine 200 will be addressed with reference to FIGS. 5A-5H. While the gaming machine 200 may simulate or animate spinning reels via main display 214, the below description does not distinguish between animated reels and mechanical reels. Unless otherwise explicitly specified in the below description or in the appended claims, the respin aspects of the present disclosure are applicable to animated reels as well as mechanical reels.

Per the respin feature of the present disclosure, the gaming machine 200 respins one or the reels when the symbol array includes a respin symbol. In some embodiments, the gaming machine 200 respins a reel only after awarding a prize for any winning combinations presented in the symbol array. Moreover, the gaming machine 200 select which reel is to be respun based on the type of respin symbol and/or the location of the respin symbol. In particular, the gaming machine 200 may respin a reel that is adjacent to a respin symbol. Furthermore, the respin symbol may indicate which reel 410 or symbols the gaming machine 200 is to respin: the reel to the left of the respin symbol; the reel to the right of the respin symbol; the reels to both the left and the right of the respin symbol; or some other reel.

Figure 5A:
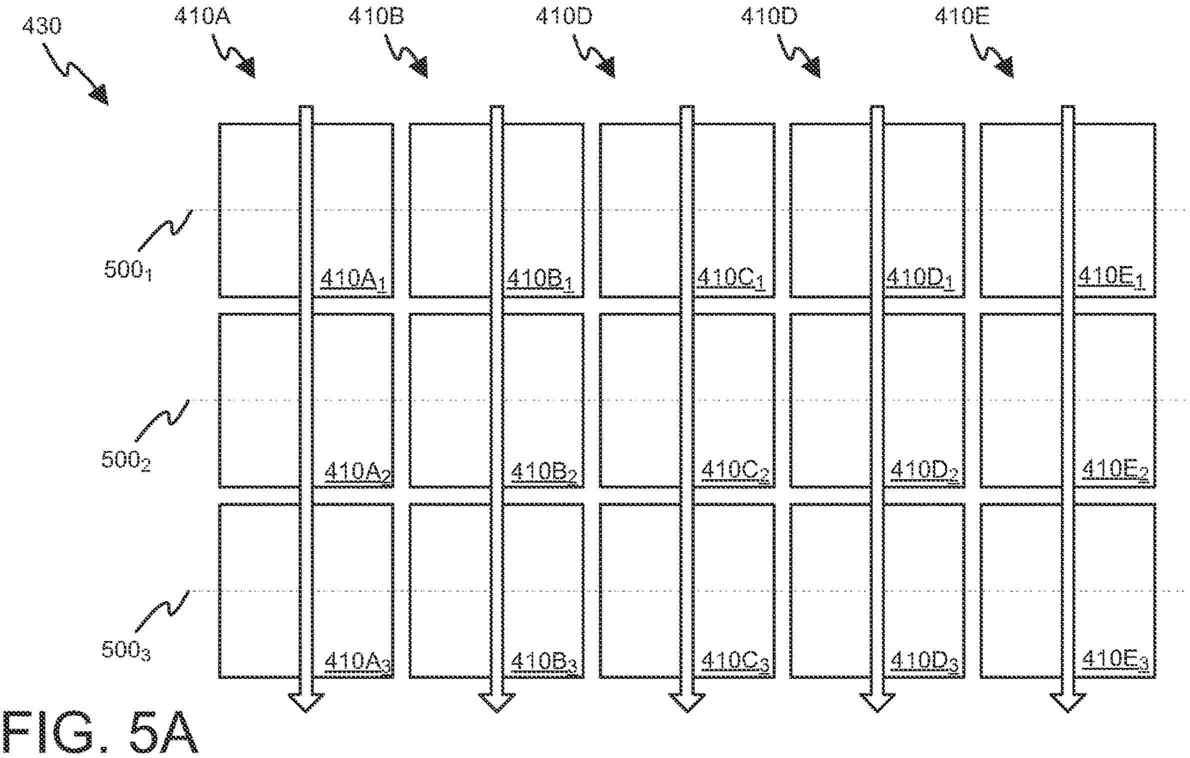
FIGS. 5A-5H depict the exemplary reels of FIG. 4 in various stages of exemplary respin processes of the present disclosure.

Referring now to FIG. 5A, the reels 410A, 410B, 410C, 410D, 410E are depicted in a currently spinning state. In particular, the gaming machine 200 may spin each reel 410A, 410B, 410D, 410E such that the column of symbols provided by each reel 410A, 410B, 410D, 410E traverses the main display 214 from top to bottom or in a downward direction.

Figure 5B:
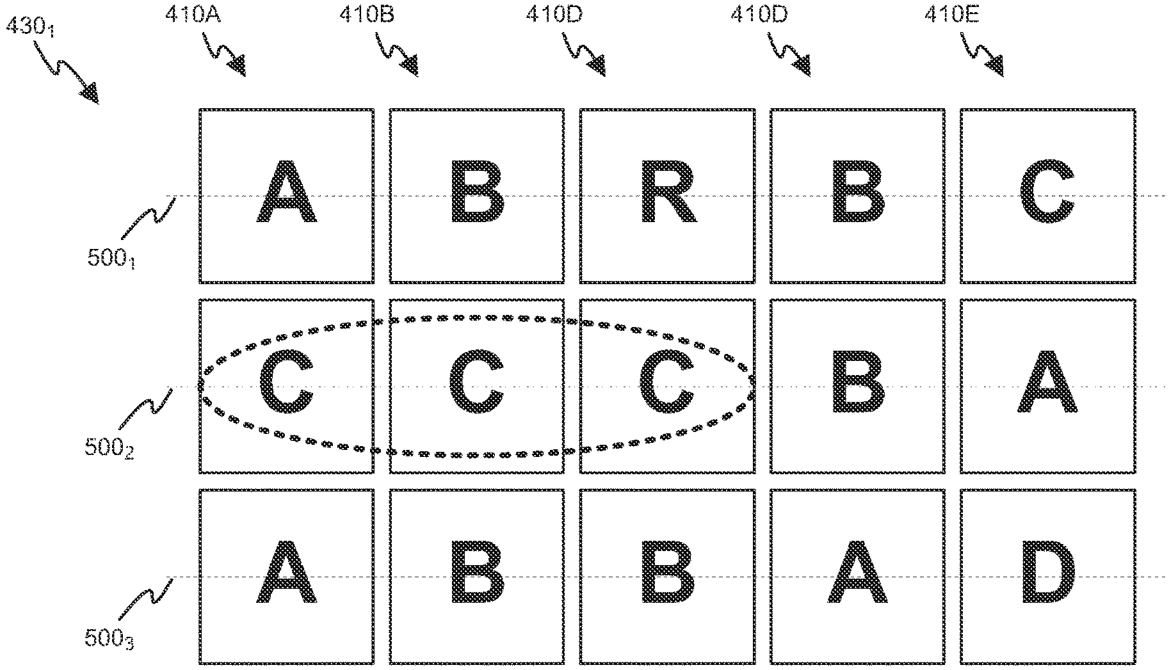

FIG. 5B depicts the reels 410A, 410B, 410C, 410D, 410E after coming to a stop or rest position to define a first game outcome comprising a first symbol array 4301. After coming to a stop, the gaming machine 200 may ascertain whether the first symbol array 4301 contains a winning combination. In one embodiment, the gaming machine 200 evaluates symbols left-to-right and includes winning combinations for three or more like symbols appearing consecutively along a payline. Thus, FIG. 5B depicts a single winning combination of C symbols along the active center payline 500$_2$. As such, the gaming machine 200 may award a prize for the three C symbols along the center payline 500$_2$ by, for example, increasing credits on a credit meter by a credit award associated with the winning combination of C symbols.

Figure 5C:
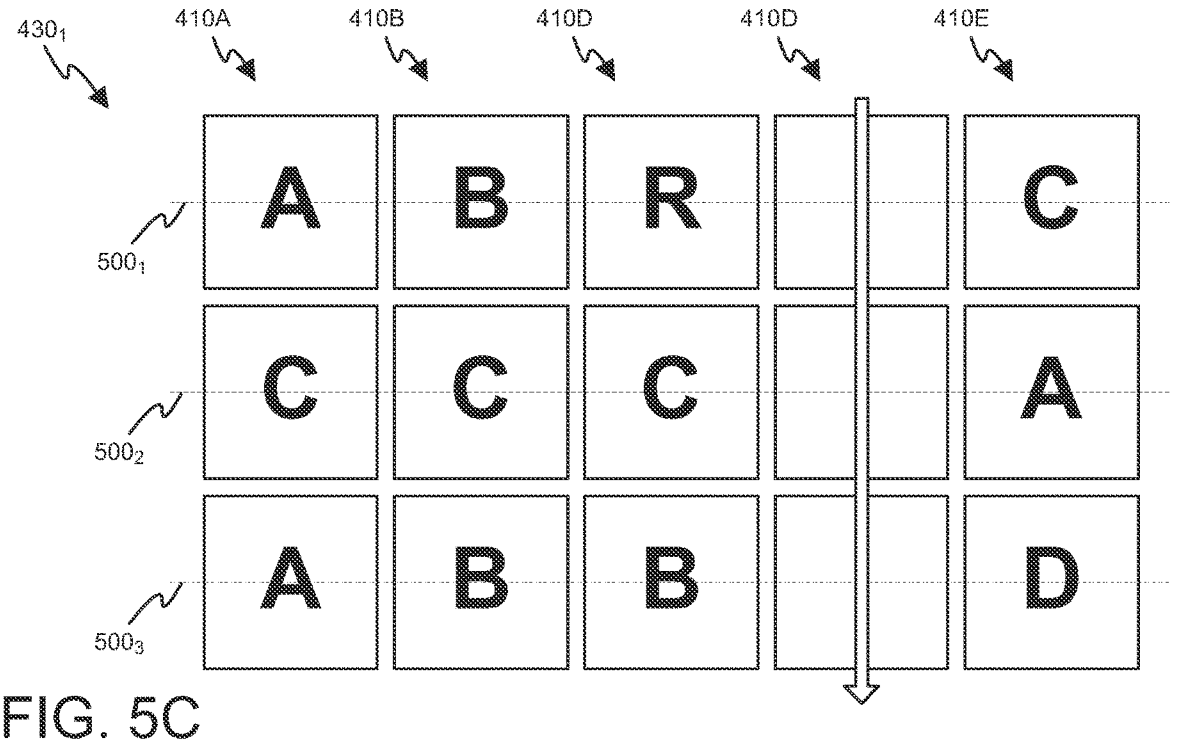

After awarding the prize for the winning combination, the gaming machine 200 may ascertain whether the first symbol array 4301 includes a respin symbol R along an active payline 500$_1$, 500$_2$, 500$_3$. As shown in FIG. 5B, the first symbol array 4301 includes a respin symbol Ron the third reel 410C along the active top payline 500$_1$. As such, the gaming machine 200 selects a reel to respin. In the depicted embodiment of FIGS. 5A-5H, the gaming machine 200 always selects the adjacent reel to the right of the identified respin symbol R. As such, the gaming machine 200 selects the fourth reel 410D and respins the fourth reel 410D as shown in FIG. 5C.

Figure 5D:
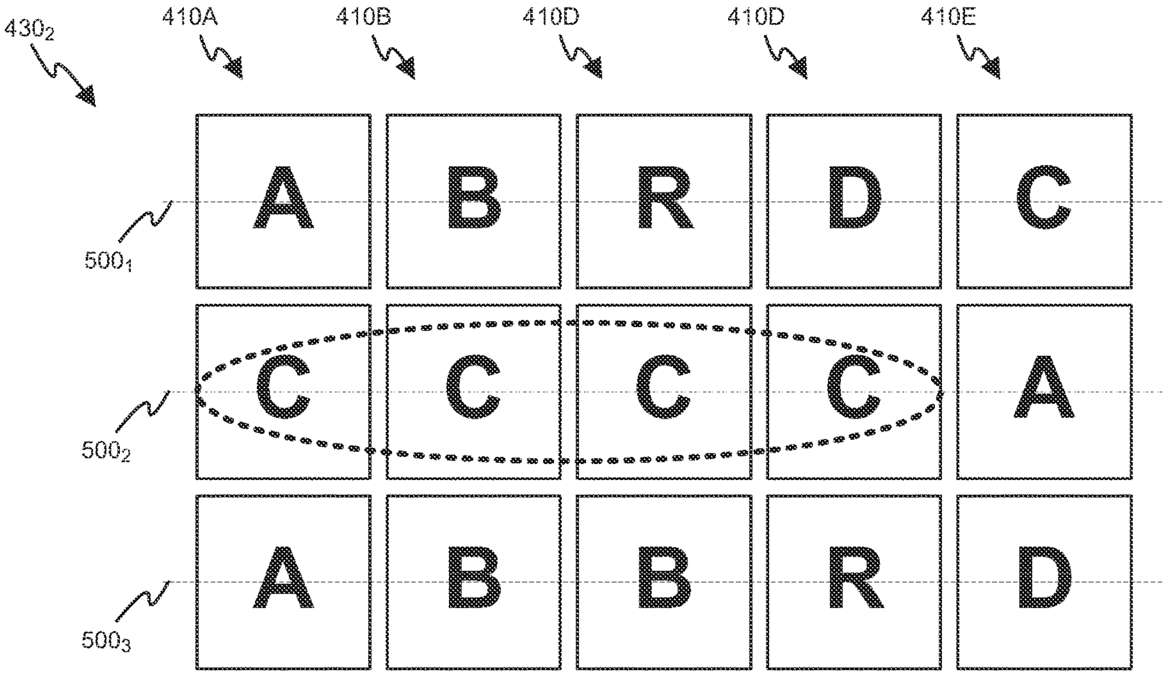

FIG. 5D depicts the reels 410A, 410B, 410C, 410D, 410E after coming to a stop or rest position to define a second game outcome comprising a second symbol array 4302. After coming to a stop, the gaming machine 200 may ascertain whether the second symbol array 4302 contains a winning combination. In particular, the gaming machine 200 may ascertain that the second symbol array 4302 contains a single winning combination of C symbols along the center payline 500$_2$. As such, the gaming machine 200 may award a prize for the four C symbols along the active center payline 500$_2$ by, for example, increasing credits on a credit meter by a credit award associated with the winning combination of C symbols.

Figure 5E:
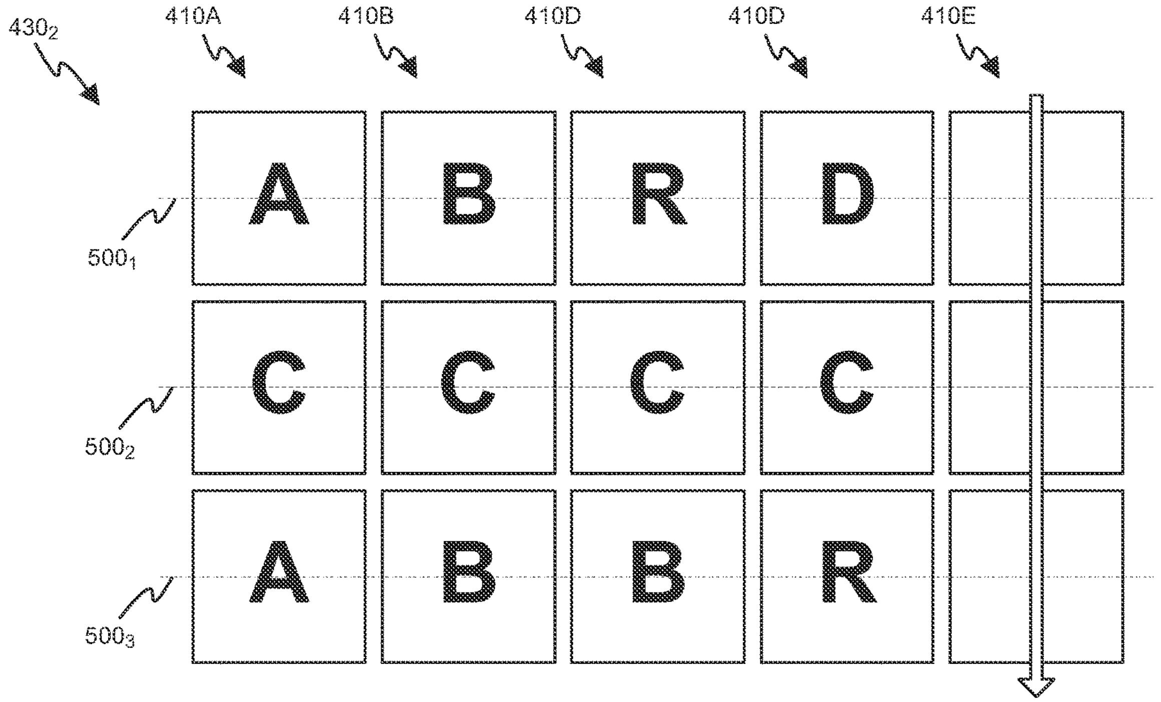

After awarding the prize for the winning combination, the gaming machine 200 may ascertain whether the respun fourth reel 410D includes a respin symbol R along an active payline $500_1$, $500_2$, $500_3$. As shown in FIG. 5D, the second symbol array 4302 includes a respin symbol R on the fourth reel 410D along the active bottom payline $500_3$. As such, the gaming machine 200 selects the adjacent reel to the right of the identified respin symbol Ron the fourth reel 410D. As such, the gaming machine 200 selects the fifth reel 410E and respins the fifth reel 410E as shown in FIG. 5E.

Figure 5F:
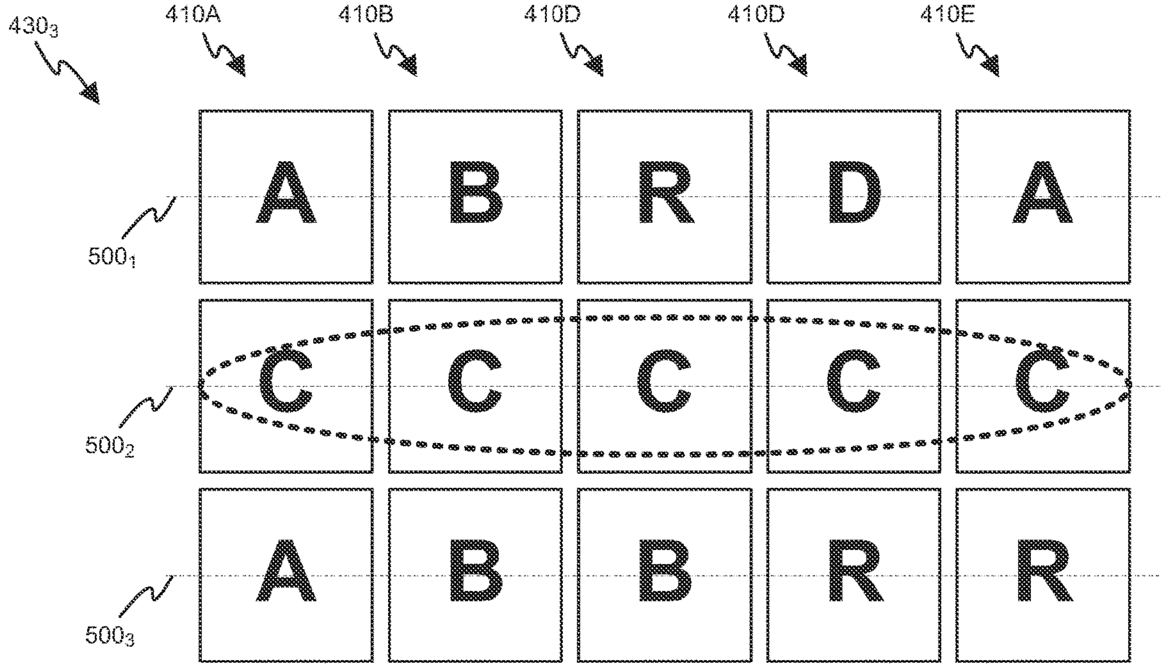

FIG. 5F depicts the reels 410A, 410B, 410C, 410D, 410E after coming to a stop or rest position to define a third game outcome comprising a third symbol array $430_3$. After coming to a stop, the gaming machine 200 may ascertain whether the third symbol array $430_3$ contains a winning combination. In particular, the gaming machine 200 may ascertain that the third symbol array $430_3$ contains a single winning combination of C symbols along the center payline $500_2$. As such, the gaming machine 200 may award a prize for the five C symbols along the active center payline $500_2$ by, for example, increasing credits on a credit meter by a credit award associated with the winning combination of C symbols.

Figure 5G:
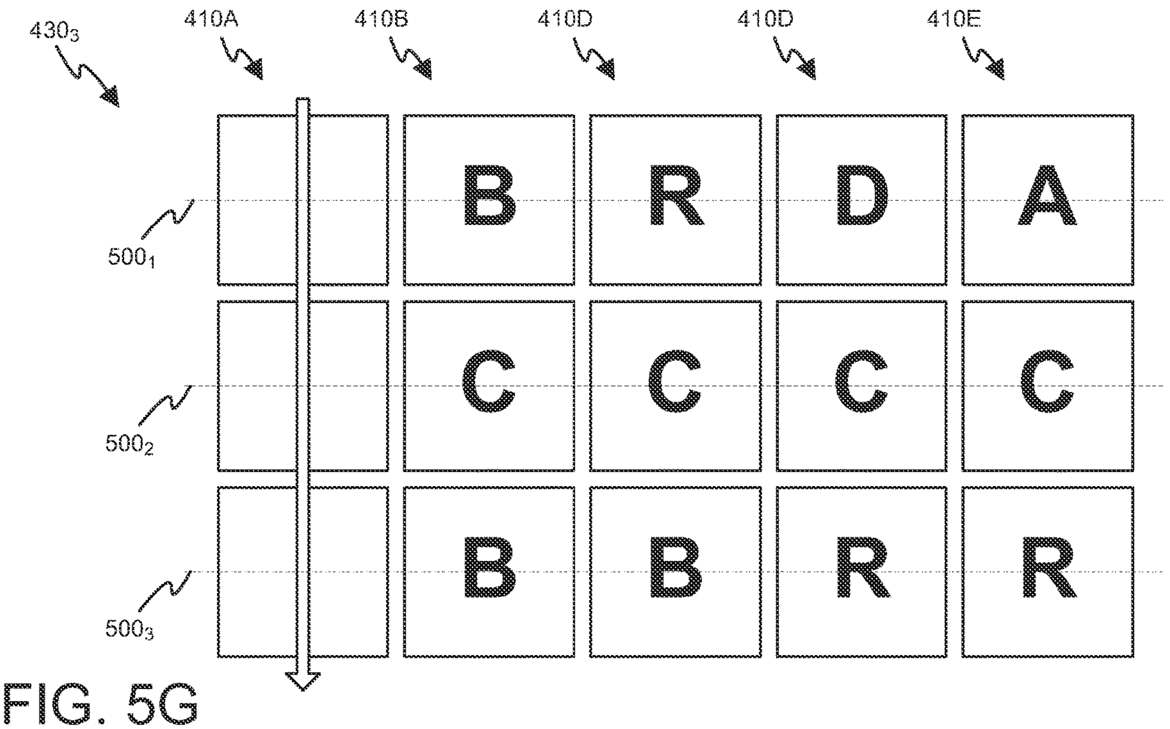

After awarding the prize for the winning combination, the gaming machine 200 may ascertain whether the respun fifth reel 410E includes a respin symbol R along an active payline $500_1$, $500_2$, $500_3$. As shown in FIG. 5F, the third symbol array $430_3$ includes a respin symbol Ron the fifth reel 410E along the active bottom payline $500_3$. As such, the gaming machine 200 selects the adjacent reel to the right of the identified respin symbol R on the fifth reel 410E. Due to wrap-around adjacency, the gaming machine 200 selects the first or initial reel 410A and respins the first reel 410A as shown in FIG. 5G.

In one embodiment, the gaming machine 200 implements wrap-around adjacency with respect to the reels 410A, 410B, 410C, 410D, 410E. In such embodiments, the gaming machine 200 may consider the reels 410A-410E as comprising an initial reel 410A, a last reel 410E, and one or more intermediary reels 410B-410D. Furthermore, the gaming machine 200 may consider the initial reel 410A and the last reel 410E in the sequence of reels 410A-410E to be adjacent. In particular, the gaming machine 200 may consider the initial reel 410A to be to the right of the last reel 410E and may consider the last reel 410E to be to the left of the initial reel 410A. In such embodiments, all reels 410A, 410B, 410C, 410D, 410E have an adjacent reel to its left and an adjacent reel to its right.

Figure 5H:
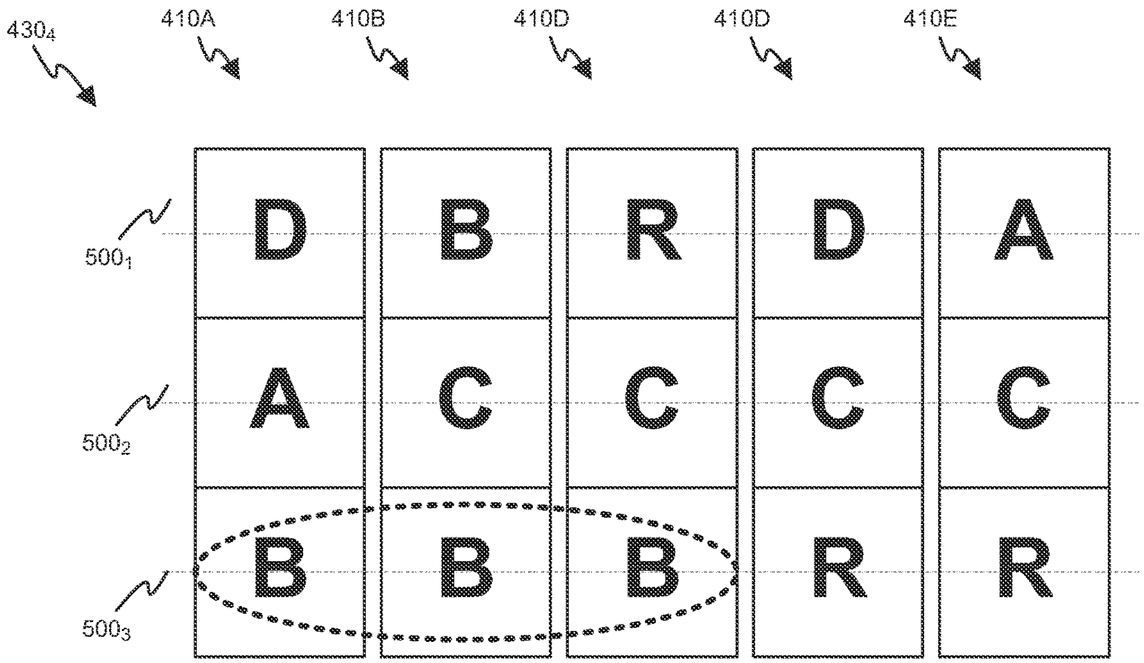

FIG. 5H depicts the reels 410A, 410B, 410C, 410D, 410E after coming to a stop or rest position to define a fourth game outcome comprising a fourth symbol array $430_4$. After coming to a stop, the gaming machine 200 may ascertain whether the fourth symbol array $430_4$ contains a winning combination. In particular, the gaming machine 200 may ascertain that the fourth symbol array $430_4$ contains a single winning combination of B symbols along the bottom payline $500_3$. As such, the gaming machine 200 may award a prize for the three B symbols along the active bottom payline $500_3$ by, for example, increasing credits on a credit meter by a credit award associated with the winning combination of B symbols.

After awarding the prize for the winning combination, the gaming machine 200 may ascertain whether the respun first reel 410A includes a respin symbol R along an active payline $500_1$, $500_2$, $500_3$. As shown in FIG. 5H, the fourth symbol array $430_4$ does not include a respin symbol Ron the first reel 410A. As such, the gaming machine 200 ceases to further select and respin reels. Accordingly, play of the present game may come to an end.

FIGS. 5A-5H depict an embodiment in which the gaming machine 200 always selects an adjacent reel to the right of the reel having the identified respin symbol R. Other embodiments may utilize a different approach for selecting the reel to respin. For example, the gaming machine 200 may randomly select between (i) the reel to the left of the respin symbol, and (ii) the reel to the right of the respin symbol. In other embodiments, the gaming machine 200 may always select the reel to the left of the respin symbol for respinning. In yet other embodiments, the gaming machine may always select both the reel to the left of the respin symbol and the reel to the right of the respin symbol for respinning.

While the above contemplates a single respin symbol R, the symbol set may include multiple, different-types of respin symbols. For example, there may be a first respin symbol that causes the gaming machine 200 to select the reel to the left of the first respin symbol for respinning; a second respin symbol that causes the gaming machine 200 to select the reel to the right of the second respin symbol for respinning; a third respin symbol that causes the gaming machine 200 to select both the reel to the left of the third respin symbol and the reel to the right of the third respin symbol for respinning; a fourth respin symbol that causes the gaming machine 200 to randomly select between the reel to the left of the fourth respin symbol and the reel to the right of the fourth respin symbol for respinning; and/or a fifth respin symbol that causes the gaming machine 200 to randomly select a reel for respinning regardless of whether the reel is adjacent to the fifth respin symbol.

Some embodiments may include respin symbols that graphically depict which reel is to be selected for respinning. In such embodiments, the respin symbols may point to the appropriate reel. For example, the respin symbol may be a depiction of a pistol pointed to the left to indicate that the gaming machine 200 is to select the reel to the left of the respin symbol. In yet other embodiments, the respin symbol itself may not indicate which reel is to be selected. However, such a symbol may incorporate a directional modifier symbol (e.g., an arrow) that indicates which reel is to be selected for respinning as shown in FIGS. 6A-6D.

Figure 6A:
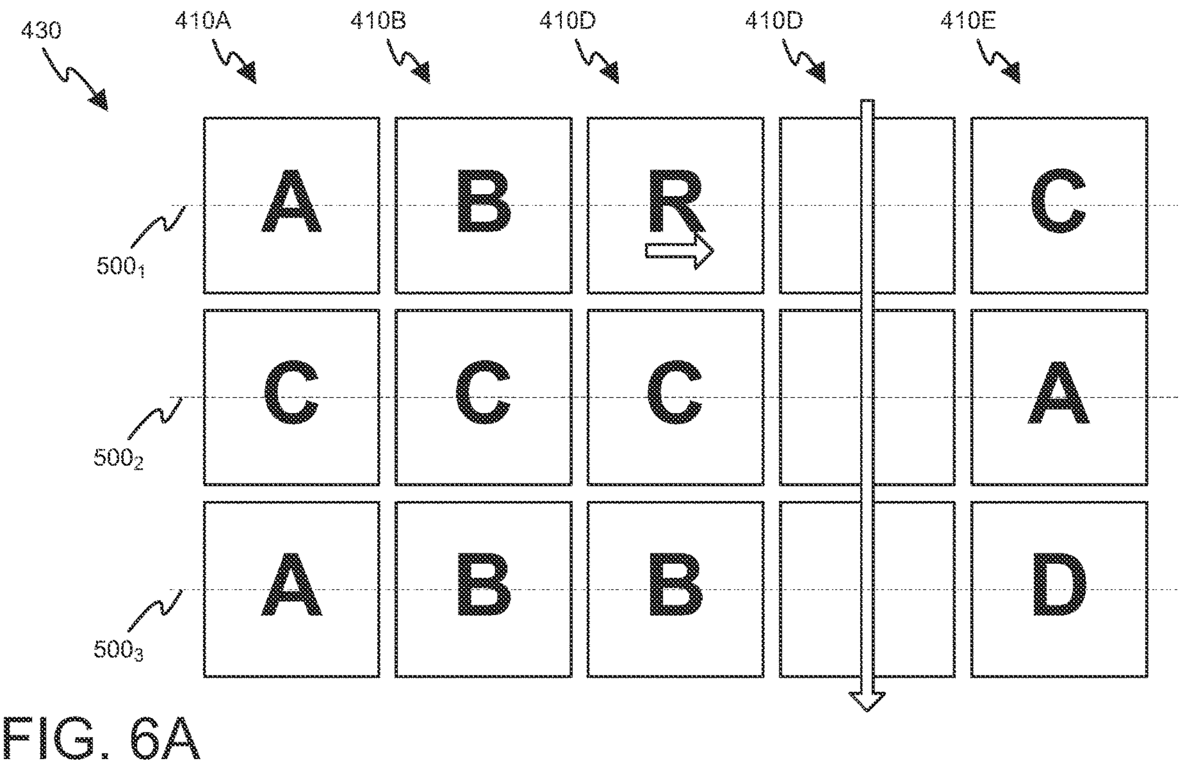
FIGS. 6A-6D depict the exemplary respin symbols and directional modifiers and their relation to reels and/or symbols selected for respin.

FIG. 6A depicts the third reel 410C with a respin symbol R and accompanying right modifier symbol 610. In particular, the right modifier symbol 610 indicates that the reel to the right of the respin symbol R is to be respun. In FIG. 6A, the right modifier symbol 610 is depicted as an arrow pointing to the right; however, other graphical representations of the right modifier symbol 610 are possible and contemplated.

Figure 6B:
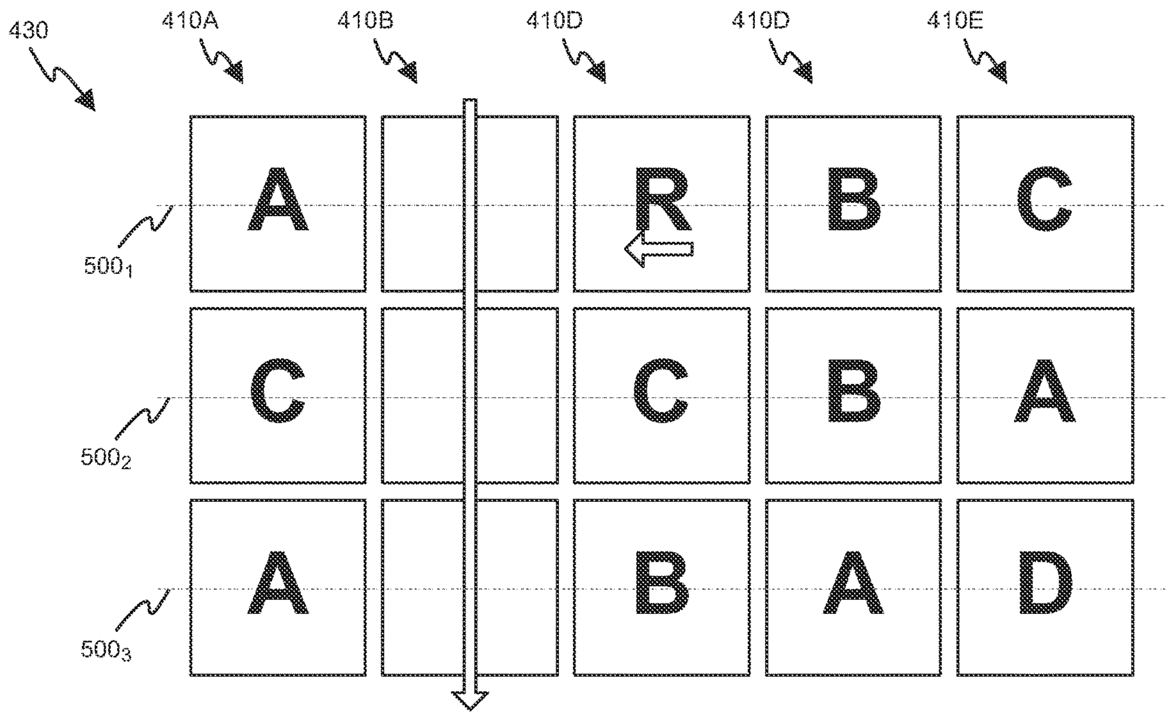

FIG. 6B depicts the third reel 410C with a respin symbol R and accompanying left modifier symbol 620. In particular, the left modifier symbol 620 indicates that the reel to the right of the respin symbol R is to be respun. In FIG. 6B, the left modifier symbol 620 is depicted as an arrow pointing to the left; however, other graphical representations of the left modifier symbol 620 are possible and contemplated.

Figure 6C:
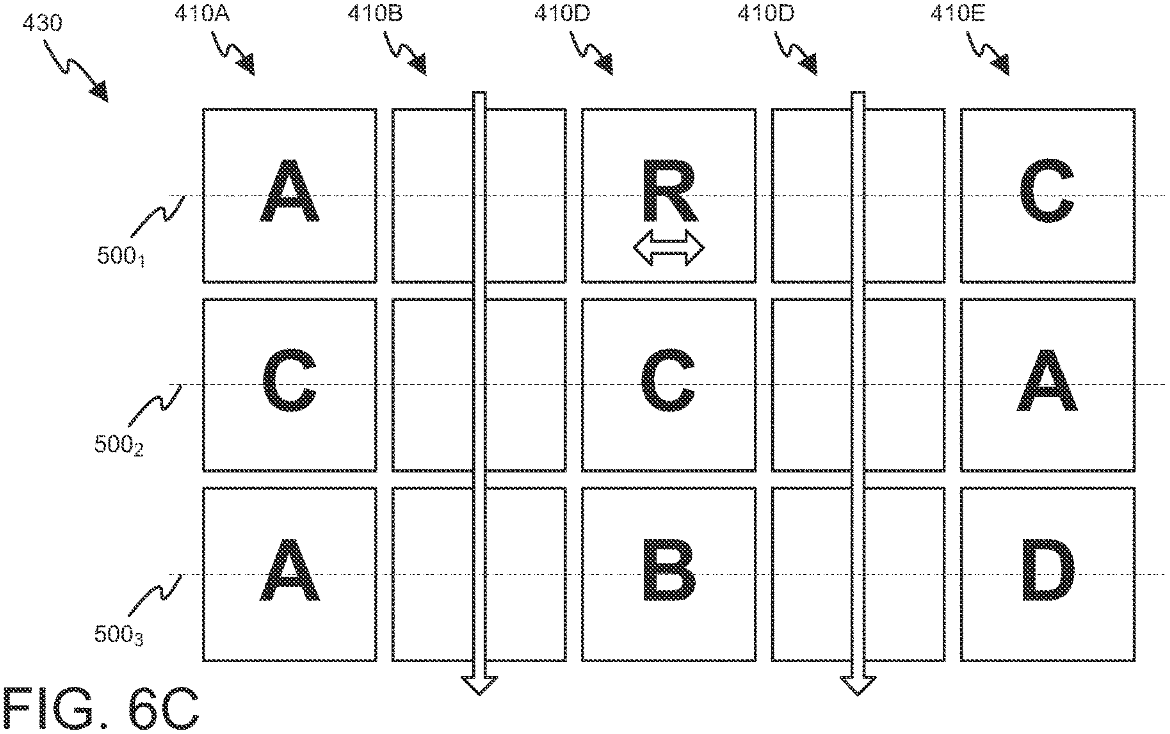

FIG. 6C depicts the third reel 410C with a respin symbol R and accompanying left-right modifier symbol 630. In particular, the left-right modifier symbol 630 indicates that the reels to the left and right of the respin symbol R are to be respun. In FIG. 6C, the left-right modifier symbol 630 is depicted as an arrow pointing to the left and to the right; however, other graphical representations of the left-right modifier symbol 630 are possible and contemplated.

Figure 6D:
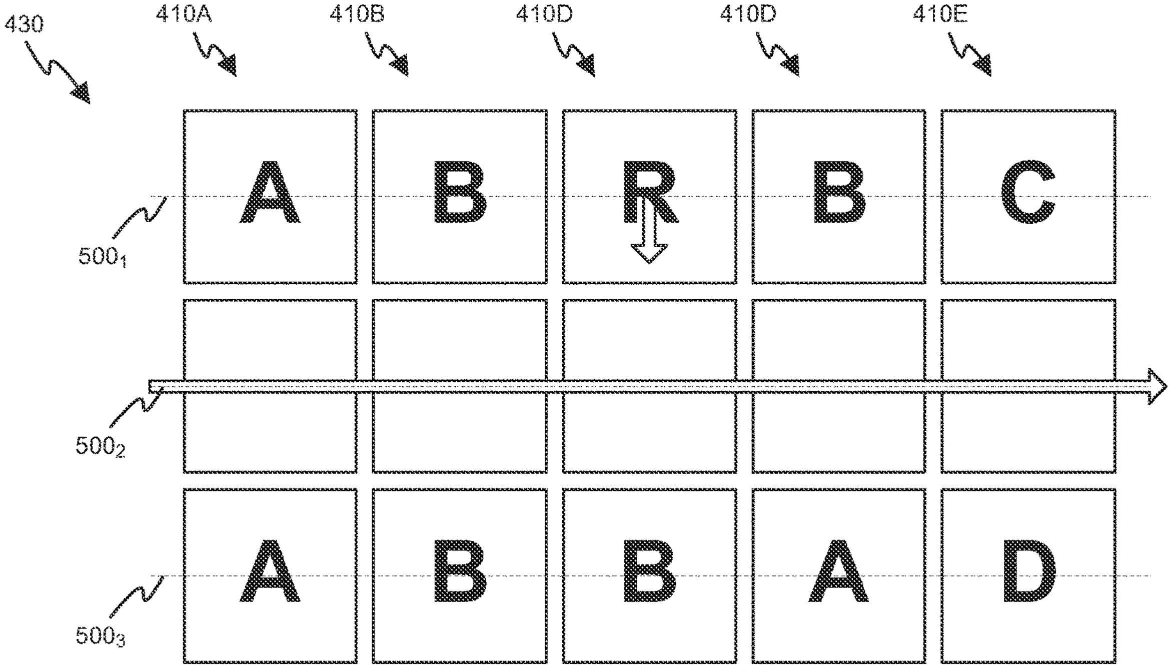

FIG. 6D depicts the third reel 410C with a respin symbol R and accompanying down modifier symbol 640. In particular, the down modifier symbol 640 indicates that the symbols in the row below the respin symbol R are to be respun. In one embodiment, the gaming machine 200 creates a virtual horizontal reel that carries only the symbols that were presented in the row before the respin, and then respins the created virtual horizontal reel. In another embodiment, the gaming machine 200 creates a virtual horizontal reel that carries the symbols that were presented in the row before the respin as well as additional symbols, and then respins the created virtual horizontal reel. In yet another embodiment, the gaming machine 200 randomly "respins" the row by randomly selected symbols for the row from a symbol set. In FIG. 6D, the down modifier symbol 640 is depicted as an arrow pointing downward; however, other graphical representations of the down modifier symbol 620 are possible and contemplated. While not shown, the gaming machine 200 may further include an up modifier that selects the symbols in the row above the respin symbol and an up-down modifier that selects the symbols in the rows above and below the respin symbol. Moreover, the gaming machine 200 may implement wrap-around adjacency between the top and bottom rows of such that (i) the top row is considered to be adjacent to and below the bottom row; and (ii) the bottom row is considered to be adjacent to and above the top row.

Figure 7:
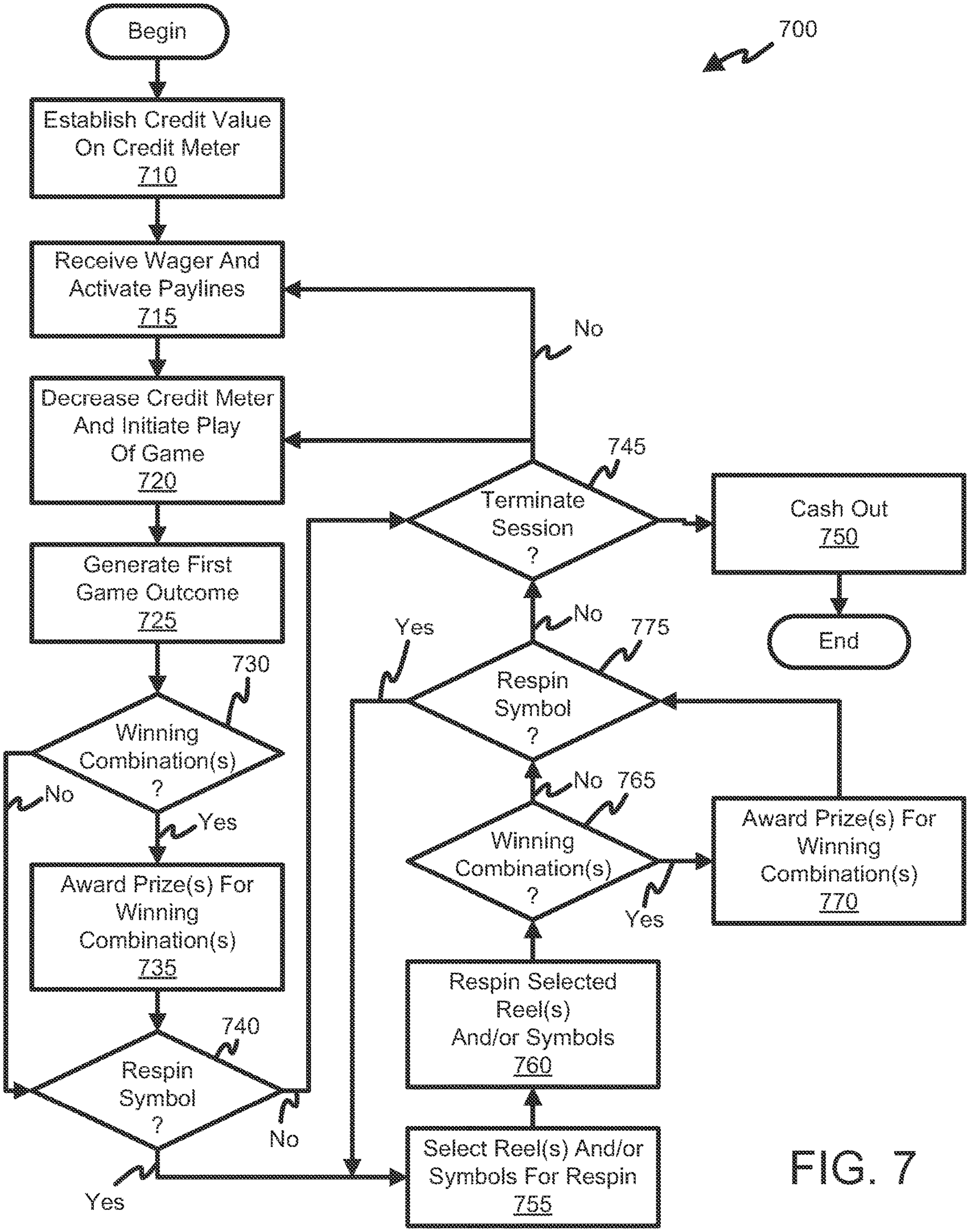
FIG. 7 provides a flowchart of an exemplary process for playing a spinning reel game of the gaming machine of FIG. 2 in accordance with various aspects of the present disclosure.

Referring to FIG. 7, a flowchart is shown of a method 700 of playing a spinning reel game of gaming machine 200 in accordance with the respin features discussed above. While presented as a primary game or base game of method 700, the spinning reel game may also be implemented as a bonus game or secondary game of the gaming machine 200.

At 710, the gaming machine 200 may establish an associated credit value on a credit meter. To this end, a player may insert a physical item having monetary value into a credit input mechanism 210 of the gaming machine 200. In response to the received physical item, the gaming machine 200 may increase a credit value of the credit meter based on the monetary value of the physical item.

At 715, the gaming machine 200 may receive a wager and may activate one or more paylines $\mathbf{500}_1$, $\mathbf{500}_2$, $\mathbf{500}_3$. In particular, a player may actuate one or more buttons 208 of the gaming machine 200 to specify a value of a wager funded by the credit value of the credit meter. Furthermore, in some embodiments, the gaming machine 200 may selectively activate a number of paylines $\mathbf{500}_1$, $\mathbf{500}_2$, $\mathbf{500}_3$ based on the specified value of the wager. In other embodiments, the gaming machine 200 may permit the player to specify via buttons 208 which paylines $\mathbf{500}_1$, $\mathbf{500}_2$, $\mathbf{500}_3$ to activate and a value to wager on each activated payline $\mathbf{500}_1$, $\mathbf{500}_2$, $\mathbf{500}_3$.

After receiving the wager and activating one or more paylines $\mathbf{500}_1$, $\mathbf{500}_2$, $\mathbf{500}_3$, the gaming machine 200 at 720 may decrease the credit meter by the specified wager and initiate play of a spinning reel game. In particular, the gaming machine 200 may initiate the spinning reel game by spinning reels 410A-410E in response to input received from the player. See, e.g., FIG. 5A. For example, the gaming machine 200 may initiate play in response to the player pressing a button 208, pulling a handle, etc. of the gaming machine 200.

At 725, the gaming machine 200 may stop the reels 410A-410E based on one or more random values generated by RNG 308 to obtain a first game outcome comprising a first array of symbols. See, e.g., FIG. 5B. In other embodiments, the gaming machine 200 may stop the reels 410A-410E based on information received from central determination gaming system 320.

The gaming machine 200 at 730 may determine whether the first array of symbols includes a winning combination of symbols along one of the activated paylines $\mathbf{500}_1$, $\mathbf{500}_2$, $\mathbf{500}_3$. If the first array of symbols includes a winning combination (see, e.g., FIG. 5B) along one of the activated paylines $\mathbf{500}_1$, $\mathbf{500}_2$, $\mathbf{500}_3$, then the gaming machine 200 at 735 may award a prize or prizes associated with the winning combination or combinations. In particular, the gaming machine 200 may award the prize(s) by increasing the credit value of the credit meter based on the prize(s) for the winning combination(s).

Regardless of whether a winning combination is present, the gaming machine 200 at 740 may determine whether the first game outcome, comprising the first array of symbols, includes a respin symbol along one of the activated paylines $\mathbf{500}_1$, $\mathbf{500}_2$, $\mathbf{500}_3$ (see, e.g., respin symbol R of FIG. 5B). If such a respin symbol is not present, then the gaming machine 200 may terminate play of the current game and proceed to 745. At 745, the gaming machine 200 may determine whether the player wishes to terminate the current gaming session. For example, the player may press a button 208 of the gaming machine 200 to "cash out" and terminate the gaming session. If the player terminates the gaming session, the gaming machine 200 at 750 may cash out any remaining credit value on the credit meter to the player via a credit output mechanism of the gaming machine. For example, the gaming machine 200 may transfer the remaining credit value by dispensing the appropriate number of coins via a coin tray or by printing a ticket with the appropriate monetary value via a printer 230*a*. If the player wishes to continue the gaming session, the gaming machine 200 may return to 715 to permit the player to adjust the wager and/or number of activated paylines $\mathbf{500}_1$, $\mathbf{500}_2$, $\mathbf{500}_3$ or may return to 720 to permit the player to initiate play of another game using the current established wager and activated payline $\mathbf{500}_1$, $\mathbf{500}_2$, $\mathbf{500}_3$.

However, if the array of symbols includes a respin symbol at 740, the gaming machine 200 at 755 may select one or more reels or symbols to respin. As explained above in regard to FIGS. 5A-5H and 6A-6D, the gaming machine 200 may select a reel or symbols to respin based on various criteria such as, for example, (i) which reel carries the respin symbol, (ii) which respin symbol is depicted, and (iii) which directional modifier symbol is depicted with the respin symbol. The gaming machine 200 at 760 may then spin and stop the selected reels and/or symbols to obtain a second outcome comprising a second array of symbols.

The gaming machine 200 at 765 may determine whether the array of symbols includes a winning combination of symbols along one of the activated paylines $\mathbf{500}_1$, $\mathbf{500}_2$, $\mathbf{500}_3$. If the array of symbols includes a winning combination (see, e.g., FIG. 5D) along one of the activated paylines $\mathbf{500}_1$, $\mathbf{500}_2$, $\mathbf{500}_3$, then the gaming machine 200 at 770 may award a prize or prizes associated with the winning combination or combinations. In particular, the gaming machine 200 may award the prize(s) by increasing the credit value of the credit meter based on the prize(s) for the winning combination(s).

Regardless of whether a winning combination is present, the gaming machine 200 at 775 may determine whether respun reel(s) and/or symbols includes respin symbol along one of the activated paylines $\mathbf{500}_1$, $\mathbf{500}_2$, $\mathbf{500}_3$ (see, e.g., respin symbol R of respun reel 410D shown in FIG. 5D). If such a respin symbol is not present on the respun reel(s) and/or symbols, then the gaming machine 200 may terminate play of the current game and proceed to 745. However, if a respin symbol is present on the respun reel(s) and/or symbols, then the gaming machine 200 at 755 may again select one or more reels or symbols to respin. In this manner, the gaming machine 200 may continue to respin reel(s) and/or symbols and paying prize(s) for winning combination(s) until the just respun reel(s) and/or symbols fail to include a respin symbol.

Numerous embodiments are described in this disclosure, and are presented for illustrative purposes only. The described embodiments are not, and are not intended to be, limiting in any sense. One of ordinary skill in the art will recognize that the disclosed embodiments may be practiced with various modifications and alterations, such as structural, logical, software, and electrical modifications. Although aspects of the present disclosure may be described with reference to one or more particular embodiments and/or drawings, it should be understood that such aspects are not limited to usage in the one or more particular embodiments or drawings unless expressly specified otherwise.

Moreover, certain embodiments may be implemented as a plurality of instructions on a tangible, non-transitory, computer readable storage medium such as, for example, flash memory devices, hard disk devices, compact disc media, DVD media, EEPROMs, etc. Such instructions, when executed by a gaming machine 200, may result in the gaming machine 200 performing various aspects of the processes depicted in FIG. 7.

The present disclosure describes only exemplary embodiments. Modifications of the above disclosed apparatus and methods which fall within the scope of the appended claims will be readily apparent to those of ordinary skill in the art. For example, although the examples discussed above are illustrated for a gaming market, embodiments of the disclosure can be implemented for other markets. Accordingly, while the present disclosure has set forth various exemplary embodiments, other embodiments may fall within the spirit and scope of the following claims.

What is claimed is:

1. A central determination system, comprising:

a controller; and a memory storing instructions which, when executed by the controller, cause the controller to generate a first game outcome and transmit one or more signals that cause a gaming machine coupled to the central determination system to:

display, on one or more display devices of the gaming machine, the first game outcome by spinning a plurality of reels displayed by the one or more display devices, wherein a first reel of the plurality of reels carries symbols including a first directional modifier that, for at least multiple successive games, points in a fixed direction toward a second reel of the plurality of reels that is adjacent to the first reel; and in response to the first reel displaying a first column of symbols that includes the first directional modifier that identifies the second reel by pointing in the fixed direction from the first reel to the second reel, respin only the second reel displayed by the one or more display devices while holding other reels of the plurality of reels in place to present a second game outcome that includes the first column of symbols and an updated second column of symbols displayed by the respun second reel.

2. The central determination system of claim 1, wherein execution of the instructions causes the controller, in response to the updated second column of symbols including a second directional modifier that identifies a third reel of the plurality of reels that is adjacent the second reel, to cause the gaming machine to respin only the third reel while holding other reels of the plurality of reels in place to present a third game outcome that includes the updated second column of symbols displayed by the respun second reel and an updated third column of symbols displayed by the respun third reel.

3. The central determination system of claim 1, wherein execution of the instructions causes the controller, in response to the updated second column of symbols including a second directional modifier that identifies the first reel, to cause the gaming machine to respin only the first reel while holding other reels of the plurality of reels in place to present a third game outcome that includes an updated first column of symbols displayed by the respun first reel and the updated second column of symbols displayed by the respun second reel.

4. The central determination system of claim 1, wherein execution of the instructions causes the controller to determine that the second reel is adjacent to the first reel, based on wrap-around adjacency between an initial reel of the plurality of reels and a last reel of the plurality of reels.

5. The central determination system of claim 1, wherein execution of the instructions causes the controller to determine the second reel is adjacent to the first reel, based on wrap-around adjacency in which an initial reel and a last reel of the plurality of reels are treated as being disposed adjacent one another.

6. The central determination system of claim 1, wherein execution of the instructions causes the controller to cause the gaming machine to spin the plurality of reels in response to input received via an input device of the gaming machine.

7. A method of a gaming system, the method comprising:

generating a first game outcome with a central determination system of the gaming system;

transmitting the first game outcome to a gaming machine via a network to cause the gaming machine to display the first game outcome by spinning a plurality of reels displayed on one or more display devices, wherein a first reel of the plurality of reels carries symbols including a first respin symbol that points in a fixed direction, for multiple successive game plays, toward a second reel of the plurality of reels that is adjacent to the first reel; and in response to the first reel displaying, on the one or more display devices, a first column of symbols that includes the first respin symbol that identifies the second reel by pointing in the fixed direction from the first reel to the second reel, respinning the second reel displayed on the one or more display devices while holding other reels of the plurality of reels in place to display a second game outcome one the one or more display devices that includes the first column of symbols and an updated second column of symbols displayed by the respun second reel.

8. The method of claim 7, comprising, in response to the updated second column of symbols including a second respin symbol that identifies a third reel of the plurality of reels that is adjacent the second reel, respinning the third reel while holding other reels of the plurality of reels in place to present a third game outcome that includes the updated second column of symbols displayed by the respun second reel and an updated third column of symbols displayed by the respun third reel.

9. The method of claim 7, comprising, in response to the updated second column of symbols including a second respin symbol that identifies the first reel, respinning the first reel while holding other reels of the plurality of reels in place to present a third game outcome that includes an updated first column of symbols displayed by the respun first reel and the updated second column of symbols displayed by the respun second reel.

10. The method of claim 7, wherein the first respin symbol comprises a directional modifier that identifies the second reel to be respun by pointing from the first reel to the second reel.

11. The method of claim 7, comprising determining that the second reel is adjacent to the first reel, based on wrap-around adjacency between an initial reel of the plurality of reels and a last reel of the plurality of reels.

12. The method of claim 7, comprising determining that the second reel is adjacent to the first reel, based on wrap-around adjacency in which an initial reel and a last reel of the plurality of reels are treated as being disposed adjacent one another.

13. A non-transitory computer readable storage medium comprising instructions that, in response to being executed by a central determination system, causes the central determination system to generate a first game outcome and transmit one or more signals that cause a gaming machine to:

spin a plurality of reels on one or more display devices of the gaming machine to present the first game outcome, wherein a first reel of the plurality of reels carries symbols including a first respin symbol with a first directional modifier that, for at least a plurality of games, points in a fixed direction toward a second reel of the plurality of reels that is adjacent to the first reel; and in response to the first reel displaying the first respin symbol with the first directional modifier that points to the second reel, respin the second reel on the one or more display devices while holding other reels of the plurality of reels in place to present a second game outcome on the one or more display devices that includes one or more first symbols displayed by the first reel and one or more updated second symbols displayed by the respun second reel.

14. The non-transitory computer readable storage medium of claim 13, wherein the instructions, in response to being executed, cause the central determination system to:

in response to the one or more updated second symbols including a second respin symbol and a second directional modifier that points to a third reel of the plurality of reels that is adjacent the second reel, cause the gaming machine to respin the third reel while holding other reels of the plurality of reels in place to present a third game outcome that includes the one or more updated second symbols displayed by the respun second reel and one or more updated third symbols displayed by the respun third reel.

* * * * *